United States Patent Office 3,829,333
Patented Aug. 13, 1974

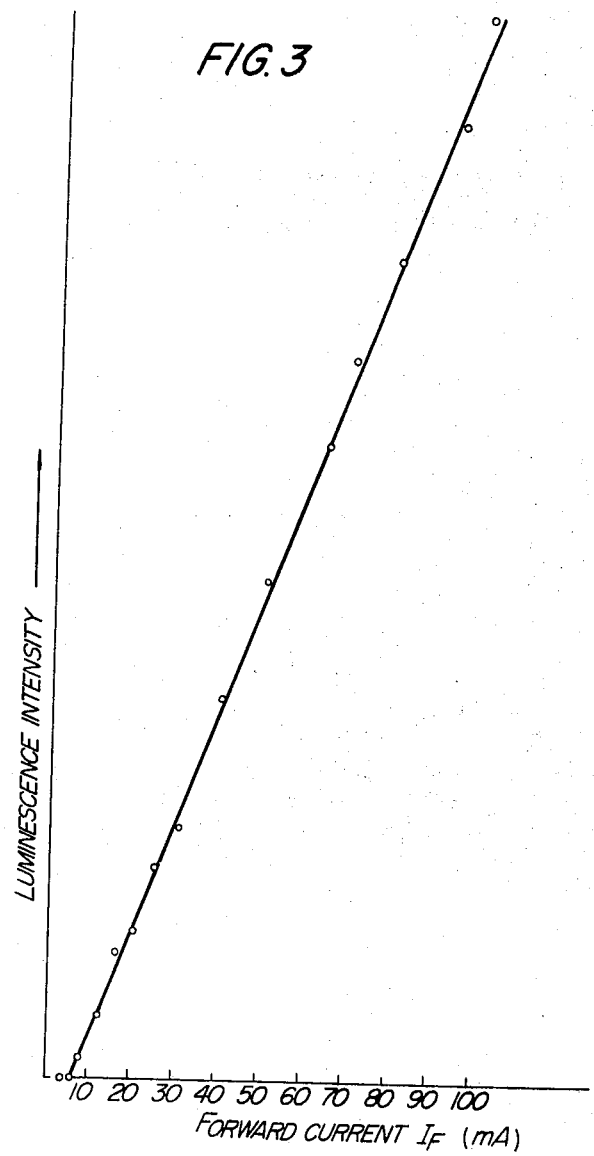

3,829,333
METHOD FOR DIFFUSING AN IMPURITY SUBSTANCE INTO SILICON CARBIDE
Atsutomo Tohi, Hirakata, Kunio Sakai, Kadoma, Masakazu Fukai, Osaka, and Yoshinobu Tsujimoto, Kashiwara, Japan, assignors to Matsushita Electric Industrial Co., Ltd., Kadoma-shi, Osaka, Japan
Original application Sept. 6, 1968, Ser. No. 758,058, now Patent No. 3,629,011. Divided and this application July 19, 1971, Ser. No. 164,128
Claims priority, application Japan, Sept. 11, 1967, 42/58,877, 42/58,905
Int. Cl. H01l 7/54
U.S. Cl. 148—1.5                    2 Claims

ABSTRACT OF THE DISCLOSURE

Impurity ions are accelerated under an irradiation condition of ordinary temperature or relatively low temperature and injected into silicon carbide from its surface.

The injected silicon carbide is annealed in a temperature range from 1600° to 1200° C. to obtain a P-N-junction and a luminescent diode based on the p-n-junction is thereby prepared.

---

This application is a division of U.S. Application Ser. No. 758,058 filed Sept. 6, 1968 and now U.S. Pat. No. 3,629,011 granted Dec. 21, 1971.

This invention relates to a method for diffusing impurity ions into silicon carbide at an ordinary, or relatively low temperature, more particularly to a method for preparing a luminescent diode of slicon carbide by diffusing impurity ions into $\alpha$-type or $\beta$-type silicon carbide and successively annealing the diffused silicon carbide in a specific temperature range.

As a method for diffusing an impurity ions into silicon carbide, there have been proposed two processes, that is, a high temperature diffusion process and an alloy process. According to the high temperature diffusion process, a surface of silicon carbide is coated or vapor-coated with such impurity substances as aluminum, borosilicate, etc. and is subjected to a thermal diffusion at a temperature of at least 1700° C. The thermal diffusion of impurity ions into silicon carbide is also carried out in an atmosphere of the impurity substance gas at a temperature of at least 1700° C.

In the former case, the thermal diffusion must be carried out in an atmosphere of a suitable gas to prevent thermal decomposition and sublimation of silicon carbide.

According to the alloy process, silicon or the like material containing impurity substances capable of imparting n-type or p-type structure is melt-deposited at a temperature of at least 1700° C. onto a surface of silicon carbide having a p-type or n-type structure, which has been already subjected to an impurity substance diffusion, and is thereby alloyed with silicon carbide.

In either process, an adjustment of high temperature and suitable atmosphere is so delicate that a reproducible result can hardly be obtained. This is a disadvantage of the conventional processes.

The present invention is to provide a diffusion process free from such a disadvantage.

One object of the present invention is to obtain a reproducible junction having good characteristics, for example, p-n-junction, etc., by injecting ionized impurity elements into silicon carbide and annealing the injected silicon carbide in a specific temperature range.

Other object of the present invention is to obtain a luminescent element having good characteristics, based on the thus obtained p-n-junction.

FIG. 3 is a characteristic diagram showing a relation between the luminescence intensity of the present luminescent diode and the forward current.

The present diffusion method is hereunder explained in detail.

In case of an n-type silicon carbide, for example, silicon carbide containing nitrogen as an impurity substance, a p-type impurity substance such as boron, aluminum, gallium, indium, etc. is accelerated to at least 10 kev. in an ion beam state and irradiated onto the n-type silicon carbide under conditions of a properly selected product of current density and irradiation time and a proper value of internal impurity concentration distribution. In case of a p-type silicon carbide, an n-type impurity substance such as phosphorus, arsenic, antimony, nitrogen, etc. is accelerated and irradiated onto the p-type silicon carbide in the same manner as above. For example, a p-n-junction can be obtained by accelerating antimony ions to 40 kev. and irradiating a p-type silicon carbide with said accelerated antimony ions at a current density of 1 $\mu$a./cm.$^2$ for 5 minutes. Electrical characteristics of the thus obtained p-n-junction can be further improved by annealing the thus irradiated sample at 800° C. for one hour in an inert gas atmosphere. By employing a procedure for selectively irradiating a surface of silicon carbide sample with an ion beam using a metallic mask, the p-n-junctions can be locally obtained without applying a photo-etching procedure to the sample surface, and a minute integrated circuit can be thus formed. In that case, a metallic mask having a thickness of at least 3$\mu$ is sufficient for an ion beam of about 60 kev. Such a procedure as a metal is vapor-deposited onto the surface of the sample, perforations are provided by the photo-etching and an ion beam irradiation effect is given only to the performated parts on the surface of the sample, can be applied to the preparation of a metallic mask in addition to the procedures for perforating a metallic sheet including the photo-etching procedure.

In general, an annealing temperature for recovering the irradiation damages is far below the impurity substance diffusion temperature and is preferably from 1600° to 1200° C. There is less fear of disturbance in the impurity substance distribution due to the heat treatment. In a special case where some adjustment of impurity substance distribution is desired, the annealing temperature or heat treatment temperature is elevated to a somewhat higher temperature, whereby some adjustment of impurity substance distribution can be attained.

Further, such a procedure that a large amount of impurity substances are injected into silicon carbide at an ordinary or relatively low temperature by the ion beam irradiation method and then the thermal diffusion is carried out can be employed. In that case, the impurity substance concentration near the surface of silicon carbide can be controlled by the acceleration voltage and current integrated value in advance, and thus a good reproducible value can be obtained in the present invention.

Figure 1:
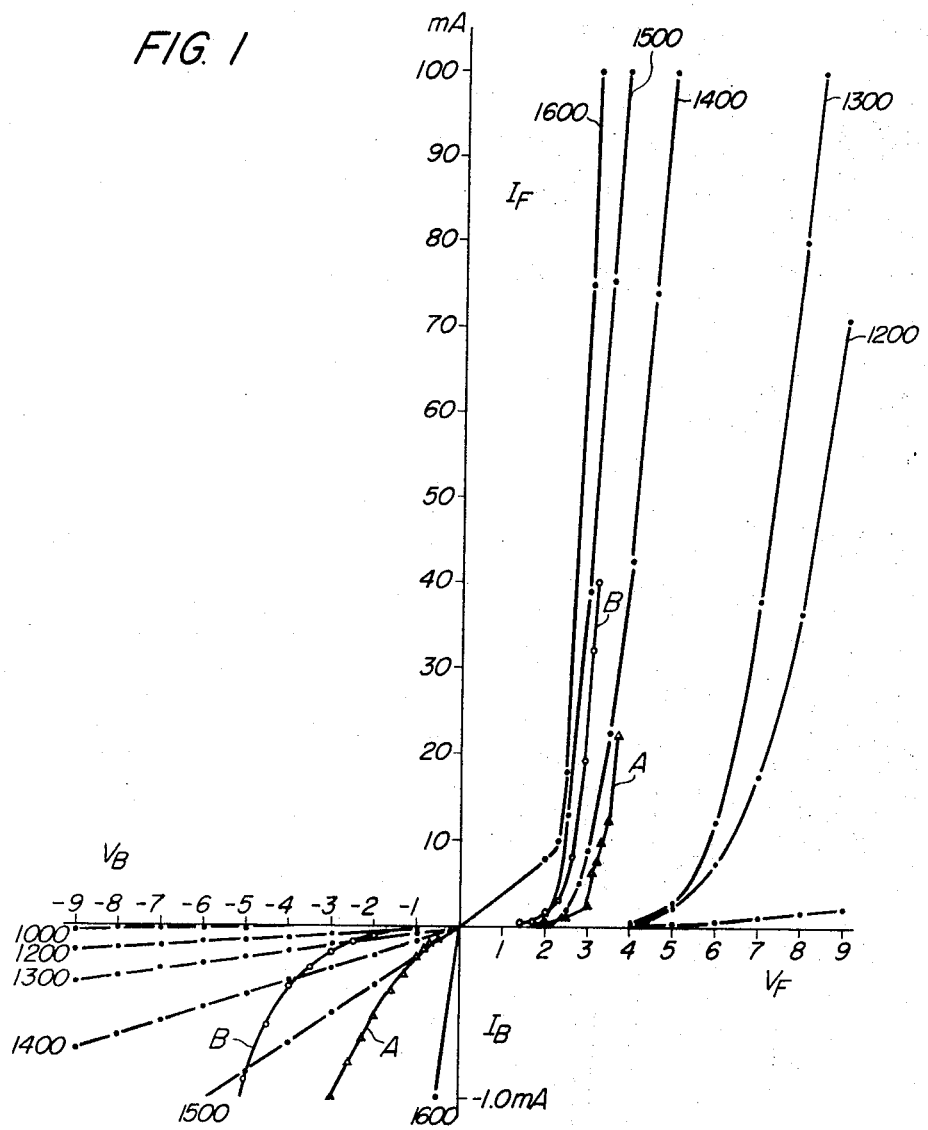
FIG. 1 is a current-voltage characteristic diagram of p-n-junction obtained by the present method for diffusing impurity ions into silicon carbide.

FIG. 1 shows a relation between the current and voltage when the thus obtained p-n-junction diode is used as a luminescent diode. At a temperature less than 1200° C., much current cannot be obtained in a forward direction, and the backward characteristics are made worse at a temperature more than 1600° C. Accordingly, the heat treatment is preferably carried out in a temperature range from 1600° to 1200° C. In FIG. 1 numerical values, 1000, 1200, 1300, 1400, 1500 and 1600 represent the heat treatment temperatures, and A and B represent characteristic curves of luminescent diodes prepared from the generally known silicon carbide. The characteristics curves of the present invention were obtained in such experiments that aluminum as an impurity substance was injected into silicon carbide in vacuum at an acceleration voltage of 50 kv. in an injection amount of $6 \times 10^{16}/cm.^2$, and the heat treatment was carried out for 10 minutes.

According to the present method, such junctions due to the differences in impurity substance concentration and kind of impurity substances as p-n-junction, p-i-n-junction, p*-p-junction, n*-n-junction, etc. can be formed in silicon carbide at an ordinarily or relatively low temperature. Further, an impurity substance can be selected irrespectively of vapor pressure, coefficient of diffusion, etc., and the factor for determining the impurity substance distribution is an inter-action of ion and crystal lattice (collision ionization). As an injecting energy of impurity substance ions is much higher than the thermal energy, the impurity substance distribution is related with a statistical distribution of collisions, and thus the selective intrusion effect due to the non-uniformity of crystals as in the case of thermal diffusion is lower and the concentration distribution at a specific depth can be made almost uniform.

Selective diffusion using a $SiO_2$ film for preparing an integrated circuit on silicon is difficult with silicon carbide. That is to say, the diffusion temperature is very high, for example, above a melting point of $SiO_2$, and thus there is little assurance as to whether $SiO_2$ can securely perform a masking action or not. In that case, the selective diffusion can be carried out at an ordinary or relatively low temperature by the selective irradiation method based on ion beam, and a minute integrated circuit can be securely formed.

Semi-conductor element of silicon carbide is rich in heat resistance and radiation resistance. For instance, a semi-conductor radiation detector of silicon carbide was prepared on trial and it was confirmed that the thus prepared semi-conductor radiation detector worked at 700° C. and had a good radiation resistance several tens times as high as that of silicon.

The minute integrated circuit of silicon carbide can endure strict radiation and temperature conditions as an element for a space instrument, and also can be incorporated into an integrated circuit on the same base plate for the luminescent diode of silicon carbide to emit a modulated light. In that case, even if the external impressed voltage is based on a direct current, the direct current is converted to an alternate current within the built-in integrated circuit, and thus an alternate current or positive pulse voltage of suitable frequency for luminescent diode can be impressed thereon. The pulse is a necessary means for increasing a luminescence efficiency, and according to the present method, the structure of integrated circuit can be much simplified and at the same time heat resistance and radiation resistance of the integrated circuit can be improved.

The n-type silicon carbide, for example, a silicon carbide containing nitrogen, and the p-type silicon carbide are irradiated with such p-type impurity substance as aluminum, indium, gallium, etc., and such n-type impurity as phosphorus, arsenic, antimony, nitrogen, etc. accelerated in an ion beam state to 10 kev. or more, respectively under such a selected condition that a product of current density and irradiation time can attain a specific impurity concentration. For example, a sample is irradiated at an accelerated voltage of 40 kv. for 10 minutes using an ion current of $2\mu a./cm.^2$. Then, annealing is conducted in an inert gas atmosphere for example in a temperature range from 1600° to 1200° C. for 10 to 20 minutes.

In that case, it is necessary that silicon carbide is monocrystals of α-type or β-type silicon carbide. Light can be emitted by impressing a voltage onto the thus prepared element.

Figure 2:
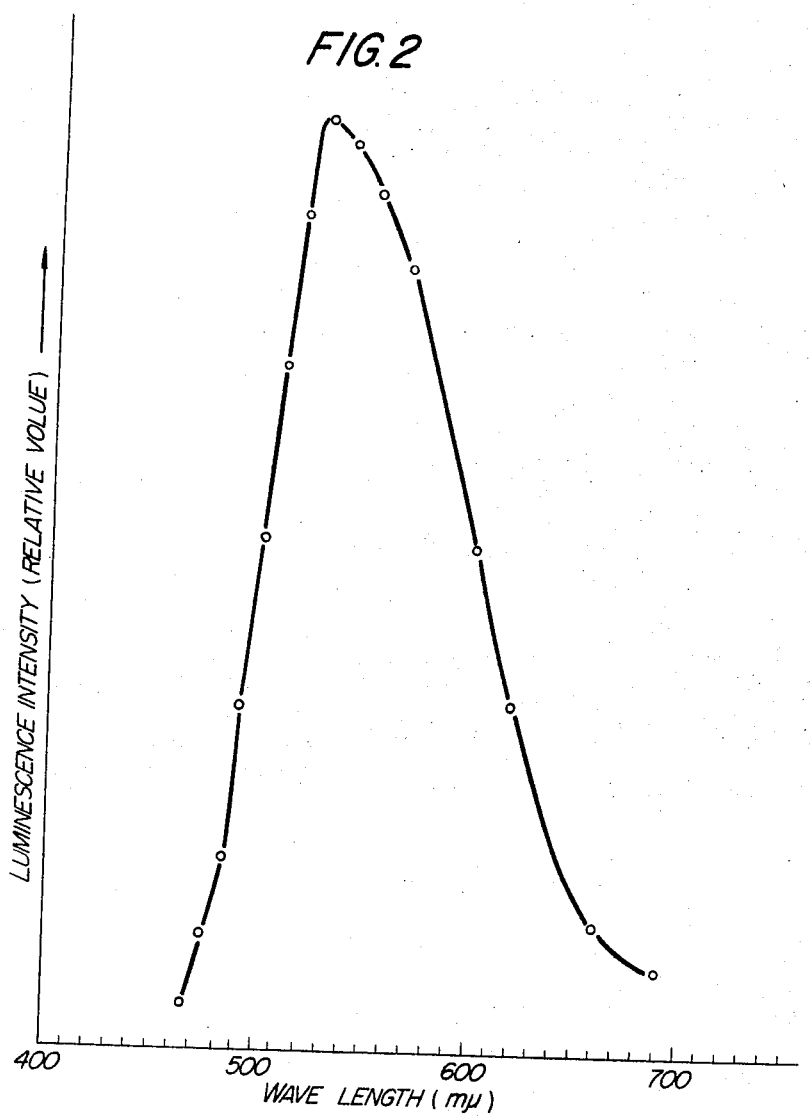
FIG. 2 is a luminescence intensity characteristic diagram of luminescent diode based on the p-n-junction obtained by the present method.

FIG. 2 shows a relation between a relative luminescence intensity, and wave length of the thus obtained luminescent diode, and FIG. 3 shows a relation between the luminescence intensity and forward current.

The luminescent diode of the present invention can be readily prepared at a good reproducibility, as mentioned below: A luminescent diode of silicon carbide can be formed at a room temperature or relatively low temperature. The impurity element can be selected irrespectively of its vapor pressure, etc. The depth of luminescent part at the junction can be controlled by the acceleration voltage. The amount of impurity substance to be added can be controlled by an integrated amount of ion beam current. A luminescent junction of any desired pattern can be formed without using any special technique such as photo-mask for high temperature, photo-etching of silicon carbide crystals which is very difficult, etc. matrix arrangement of luminescent diode, etc. can be readily carried out.

When an ultra-minute luminescent element is to be prepared, silicon carbide is irradiated with an impurity ion beam through a mask having minute perforations, for example, perforations having a diameter of $30\mu$, and heat-treated successively, whereby such an ultra-minute luminescent element can be prepared. According to another procedure, a portion of a surface of silicon carbide is irradiated with an impurity ion beam and heat-treated, whereby a thin p-n-junction is prepared. Then, two electrodes are attached to the silicon carbide, one small electrode on the irradiated side, another on the back side off-centered to the former electrode, and the silicon carbide is subjected to luminescence, by impressing a voltage across the electrodes. The protruded part of the luminescent section from the electrode can be kept to 5% of the electrode dimension because of high sheet resistivity due to shallow junction depth, and thus an ultra-minute luminescent element can be obtained by making the electrode smaller. A luminescent spot is observed from the back side, through the transparent silicon carbide.

Further, a portion of the surface of silicon carbide is irradiated with a impurity ion beam and heat-treated whereby a thin p-n-junction is prepared. Then, by providing on the irradiated surface a desired pattern with a conductor having an ohmic junction, a luminescent element can be formed according to the pattern, In that case, the luminescent state can be observed from the back side.

What we claim is:

1. A method for preparing a minute luminescent diode including a transparent crystal of silicon carbide having a surface and a back side, said method comprising the steps of accelerating an ionized impurity element; injecting said element into a portion of the surface of said silicon carbide; heat treating said silicon carbide in the temperature range between 1200° C. and 1600° C.; attaching a first minute electrode to the irradiated portion of the surface of said silicon carbide; attaching a second electrode to a non-irradiated portion of said silicon carbide, said second electrode being placed in such position that it does not obstruct the view through the transparent crystal of said silicon carbide of the first electrode placed on the irradiated surface, said diode being excitable by application of a voltage between said first and second electrodes to produce light observable just behind said first electrode when viewed from the back side of said silicon carbide.

2. A method for preparing a luminescent diode including a transparent crystal of silicon carbide having a surface and a back side, said method comprising the steps of accelerating an ionized impurity element; injecting said element into a portion of the surface of said silicon carbide; heat treating said silicon carbide in the temperature range between 1200° C. and 1600° C.; attaching to the irradiated portion of said surface first electrodes which compose a desired pattern; attaching a second electrode on a non-irradiated portion of said silicon carbide, said second electrode being placed in such position that it does not obstruct the view through the transparent crystal of said silicon carbide of the first electrodes placed on the irradiated portion, said diode being excitable by the application of a voltage between said first electrodes on the irradiated portion of said silicon carbide and said second electrode on the non-irradiated portion of said silicon carbide to produce light observable just behind said first electrodes placed on the irradiated portion of said silicon carbide when viewed from the back side of said silicon carbide.

References Cited

UNITED STATES PATENTS

| | | | |
|---|---|---|---|
| 2,787,564 | 4/1957 | Shockley | 148—1.5 |
| 2,842,466 | 7/1958 | Moyer | 148—1.5 |
| 3,341,754 | 9/1967 | Kellett et al. | 148—1.5 X |
| 3,527,626 | 9/1970 | Brander | 148—33.4 |
| 3,515,956 | 6/1970 | Martin et al. | 148—1.5 X |

L. DEWAYNE RUTLEDGE, Primary Examiner

J. M. DAVIS, Assistant Examiner

U.S. Cl. X.R.

29—576; 148—187; 317—235